United States Patent
Park (10) Patent No.: US 9,969,636 B2
(45) Date of Patent: May 15, 2018

(54) SEPTIC TANK FOR GENERATING METHANE GAS

(71) Applicant: JONGHO ENTERPRISE CO., LTD., Seoul (KR)

(72) Inventor: Yong-Tai Park, Seoul (KR)

(73) Assignee: JONGHO ENTERPRISE CO., LTD., Seoul (KR)

( * ) Notice: Subject to any disclaimer, the term of this patent is extended or adjusted under 35 U.S.C. 154(b) by 211 days.

(21) Appl. No.: 14/979,595

(22) Filed: Dec. 28, 2015

(65) Prior Publication Data

US 2016/0107910 A1  Apr. 21, 2016

Related U.S. Application Data

(63) Continuation of application No. PCT/KR2014/005595, filed on Jun. 24, 2014.

(30) Foreign Application Priority Data

Jun. 26, 2013  (KR) .......................... 10-2013-0073517

(51) Int. Cl.
*C02F 3/28* (2006.01)
*C02F 11/04* (2006.01)
(Continued)

(52) U.S. Cl.
CPC .............. *C02F 3/2866* (2013.01); *C02F 3/28* (2013.01); *C02F 11/04* (2013.01); *E03F 11/00* (2013.01);
(Continued)

(58) Field of Classification Search
CPC .......... C02F 3/2866; C02F 3/28; C02F 11/04; E03F 11/00
(Continued)

(56) References Cited

U.S. PATENT DOCUMENTS 3,536,196 A * 10/1970 Zeff ........................ E03D 5/016
                                                    4/322
6,106,716 A *  8/2000 Berkman .............. C02F 3/1242
                                                    210/177
(Continued)

FOREIGN PATENT DOCUMENTS

CN      102284470       12/2011
KR   10-2001-0054083     7/2001
(Continued)

*Primary Examiner* — Tuan N Nguyen
(74) *Attorney, Agent, or Firm* — JCIPRNET (57) ABSTRACT

Provided is a septic tank for generating methane gas, including: a water-saving type toilet installed in a restroom of a building and discharging excreta of users, wherein high-density excreta is discharged from the water-saving type toilet by using a reduced amount of water to discharge the excreta; an excreta storage tank buried underground and connected to the water-saving type toilet to store the excreta discharged from the water-saving type toilet; a heating unit for heating the excreta storage tank so as to increase a fermentation speed of the excreta in the excreta storage tank; a methane gas supply unit for collecting and discharging methane gas generated as the excreta in the excreta storage tank is fermented; and a gas storage tank connected to the methane gas supply unit to store the methane gas discharged from the methane gas supply unit.

9 Claims, 4 Drawing Sheets

(51) Int. Cl.
*E03F 11/00* (2006.01)
*C02F 103/00* (2006.01)
*A47K 11/02* (2006.01)

(52) U.S. Cl.
CPC .......... *A47K 11/02* (2013.01); *C02F 2103/005* (2013.01); *Y02E 50/343* (2013.01); *Y02W 10/12* (2015.05); *Y02W 10/23* (2015.05); *Y02W 10/37* (2015.05)

(58) Field of Classification Search
USPC ..................................................... 4/321, 322
See application file for complete search history.

(56) References Cited

U.S. PATENT DOCUMENTS

| | | | | |
|---|---|---|---|---|
| 7,014,778 B2* | 3/2006 | Fuchigami | ........... | A47K 11/023 4/318 |
| 2013/0130346 A1* | 5/2013 | Hansen | ..................... | C02F 3/28 435/167 |
| 2014/0113361 A1* | 4/2014 | Berasi | ....................... | C02F 3/28 435/289.1 |
| 2015/0030944 A1* | 1/2015 | Yun | ..................... | H01M 8/0662 429/411 |
| 2015/0076058 A1* | 3/2015 | Brooks | ................ | C02F 3/2866 210/603 |

FOREIGN PATENT DOCUMENTS

| | | |
|---|---|---|
| KR | 10-0573960 | 4/2006 |
| KR | 10-0770956 | 10/2007 |
| KR | 10-0965184 | 6/2010 |
| KR | 10-2012-0083538 | 7/2012 |

* cited by examiner

SEPTIC TANK FOR GENERATING METHANE GAS

CROSS-REFERENCE TO RELATED APPLICATIONS

This application is a Continuation of PCT International Application No. PCT/KR2014/005595, filed on Jun. 24, 2014, which claims priority under 35 U.S.C. § 119(a) to Patent Application No. 10-2013-0073517, filed in Korea on Jun. 26, 2013, all of which are hereby expressly incorporated by reference into the present application.

BACKGROUND

1. Field

One or more exemplary embodiments relate to a septic tank for generating methane gas, and more particularly, to a septic tank for generating methane gas, in which methane gas generated from excreta in the septic tank may be produced as an energy source.

2. Description of the Related Art

In general, toilets are provided in buildings such as office or school buildings, and excreta which is the final product of the digestion process of the human body is discharged to a septic tank via the toilets. The excreta discharged from the toilets and stored in the septic tank may be supplied to farmland of crops and used as a fertilizer for facilitating growth of the crops. However, recently, excreta is not much used as a fertilizer for farmland due to development of chemical fertilizers that greatly increase growth of crops in the short term. Moreover, due to environmental pollution, most of excreta is discarded after undergoing a predetermined process, and a rate of reusing the excreta as resources is very small.

An alternative way of using excreta as fuel besides as a fertilizer has recently been suggested. Korean Patent No. 0965184 (published on Jun. 14, 2010) discloses a sewage disposal tank having a methane gas collection function, in which methane gas generated during an excreta processing process is collected so as to use it as fuel. A typical toilet uses about 10 to 15 liters of water per each discharge to discharge excreta of a user. Such a large amount of discharged water is stored in the sewage disposal tank together with excreta of users. Accordingly, it is difficult for fermentation to take place in the excreta which is diluted with water so that methane gas is hardly generated.

SUMMARY

One or more exemplary embodiments include a septic tank for generating methane gas, in which high-density excreta is stored and fermented so that a large amount of methane gas is generated.

Additional aspects will be set forth in part in the description which follows and, in part, will be apparent from the description, or may be learned by practice of the presented embodiments.

According to one or more exemplary embodiments, a septic tank for generating methane gas includes: a water-saving type toilet installed in a restroom of a building and discharging excreta of users, wherein high-density excreta is discharged from the water-saving type toilet by using a reduced amount of water to discharge the excreta; an excreta storage tank buried underground and connected to the water-saving type toilet to store the excreta discharged from the water-saving type toilet; a heating unit for heating the excreta storage tank so as to increase a fermentation speed of the excreta in the excreta storage tank; a methane gas supply unit for collecting and discharging methane gas generated as the excreta in the excreta storage tank is fermented; and a gas storage tank connected to the methane gas supply unit to store the methane gas discharged from the methane gas supply unit.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, the inventive concept will be described in detail with reference to the attached drawings.

Figure 1:
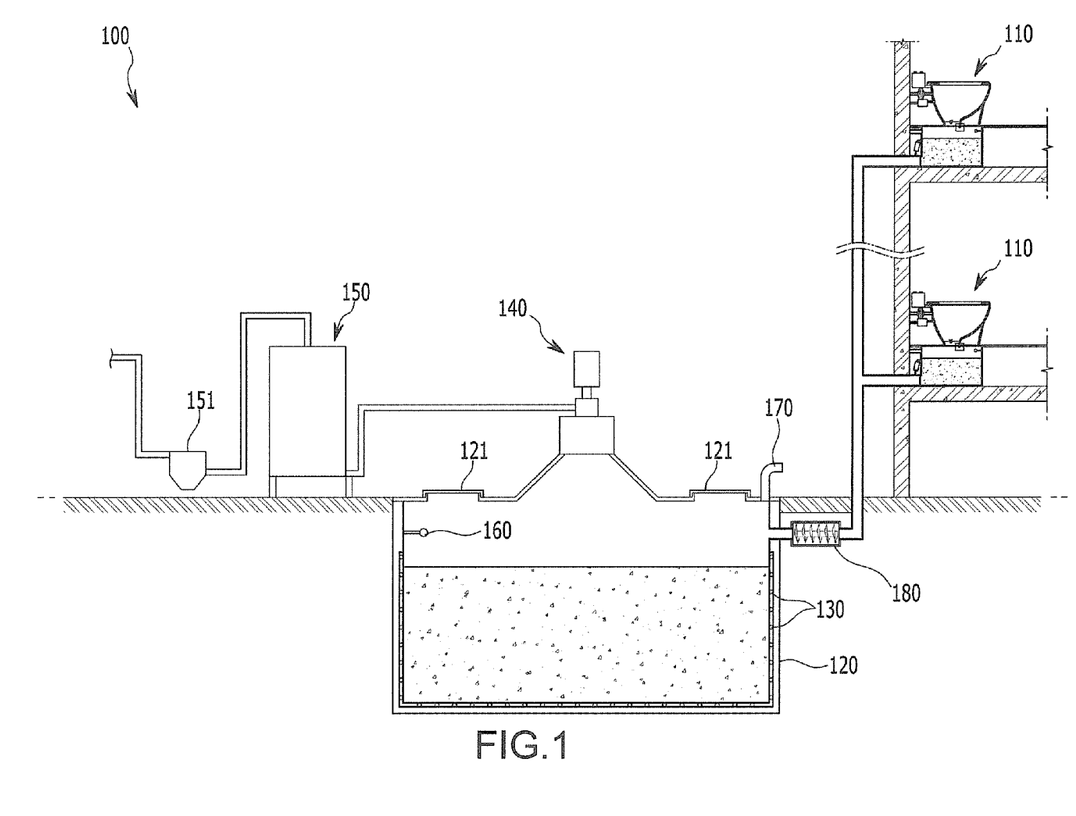
FIG. 1 is a schematic view of a septic tank for generating methane gas, according to an exemplary embodiment of the inventive concept.

FIG. 1 is a schematic view of a septic tank 100 for generating methane gas, according to an exemplary embodiment of the inventive concept. Referring to FIG. 1, the septic tank 100 for generating methane gas according to the present exemplary embodiment includes a water-saving type toilet 110, an excreta storage tank 120, a heating unit 130, a methane gas supply unit 140, and a gas storage tank 150.

The water-saving type toilet 110 is installed in restrooms of buildings such as at home, school buildings, office buildings or factories and discharge excreta of users. The water-saving type toilet 110 according to the present exemplary embodiment saves a water usage amount when discharging excreta, and particularly, has a function of discharging high-density excreta. That is, the water-saving type toilet 110 uses a relatively small amount of about 1 to 5 liters of water per each discharge so as to discharge high-density excreta that is diluted relatively little with water.

The excreta storage tank 120 is buried underground of a building, and is connected to the water-saving type toilet 110 to store excreta discharged from the water-saving type toilet 110. Each connection portion of the excreta storage tank 120 may be tightly sealed so that excreta thereinside is not leaked to the outside. The excreta storage tank 120 according to the present exemplary embodiment may be configured to only store but not discharge the excreta through a drain. That is, by not discharging excreta through a drain, as in previous cases where excreta is discharged from a septic tank to a terminal disposal plant of sewage through a drain, environmental pollution due to discharge of wastewater may be prevented.

In the above-described structure, a lid 121 may be installed on the excreta storage tank 120. The lid 121 is mounted on the excreta storage tank 120 to be opened or closed so as to discharge excreta left after being heated by using the heating unit 130, which will be described later, to the outside.

The heating unit 130 is installed in the excreta storage tank 120 to heat excreta in the excreta storage tank 120. The heating unit 130 according to the present exemplary embodiment may be hot wires. The hot wires may be installed on sidewalls and the bottom of the excreta storage tank 120 and receive electricity from an external electric device to generate heat. The heating unit 130 may heat the excreta so as to generate a relatively large amount of methane gas in a short time compared to natural fertilization. In particular, by using the heating unit 130, fermentation may be conducted even in winter with a low temperature so that methane gas may be continuously generated.

The methane gas supply unit 140 is installed above the excreta storage tank 120 so as to collect and discharge methane gas in the excreta storage tank 120. The methane gas supply unit 140 according to the present exemplary embodiment may be a supply pump. The supply pump sucks and discharges methane gas discharged from excreta of the excreta storage tank 120. In particular, an upper portion of the excreta storage tank 120 is formed in the form of a hopper having a center portion protruding upwards and having a diameter decreasing upwards. The hopper shape is provided to increase a suction force of the methane gas supply unit 140 when the methane gas supply unit 140 installed above the excreta storage tank 120 sucks the excreta of the excreta storage tank 120.

The gas storage tank 150 is connected to the methane gas supply unit 140 to store methane gas discharged from the methane gas supply unit 140. A moisture eliminator 151 is connected to the gas storage tank 150 according to the present exemplary embodiment. The moisture eliminator 151 eliminates moisture of the methane gas supplied from the methane gas supply unit 140 and extracts only methane gas that is usable as fuel. The methane gas from which moisture is eliminated is used as various energy sources for heating or cooling purposes in apartments, schools, factories or the like.

The septic tank 100 for generating methane gas according to the present exemplary embodiment may further include a pressure sensor 160, a gas discharge valve 170, and a crusher 180.

The pressure sensor 160 is installed in an upper portion in the excreta storage tank 120 so as to sense a pressure of methane gas in the excreta storage tank 120. The gas discharge valve 170 is installed on the excreta storage tank 120 to be opened or closed so as to discharge the pressure of methane gas of the excreta storage tank 120 to the outside. That is, the gas discharge valve 170 is opened when the pressure of methane gas in the excreta storage tank 120 sensed by using the pressure sensor 160 is equal to or higher than a predetermined pressure. The gas discharge valve 170 is operated such that when a methane gas pressure in the excreta storage tank 120 is increased, the pressure sensor 160 senses the increased methane gas pressure so as to open the gas discharge valve 170. Then the methane gas in the excreta storage tank 120 is discharged to the outside through the gas discharge valve 170. When methane gas is discharged to the outside so that a pressure in the excreta storage tank 120 is reduced to a predetermined pressure or lower, the pressure sensor 160 blocks the gas discharge valve 170 so that the excreta storage tank 120 is internally sealed. As described above, the pressure sensor 160 and the gas discharge valve 170 may prevent explosion of the excreta storage tank 120 due to an increase in a pressure of methane gas in the excreta storage tank 120.

The crusher 180 is installed at the excreta storage tank 120 to crush excreta that is discharged from the water-saving type toilet 110 to enter the excreta storage tank 120. In particular, the crusher 180 finely crushes high-density excreta discharged from the water-saving type toilet 110 so that a relatively large amount of methane gas is erupted from the excreta stored in the excreta storage tank 120.

Hereinafter, an operation of the septic tank 100 for generating methane gas configured as described above will be described.

First, referring to FIG. 1, excreta discharged from the water-saving type toilet 110 is stored in the excreta storage tank 120. The excreta is finely crushed by using the crusher 180 installed at the excreta storage tank 120 and stored in the excreta storage tank 120.

The heating unit 130 operates when the excreta is stored in the excreta storage tank 120 to heat the excreta, and methane gas is erupted from the excreta heated by using the heating unit 130. In this structure, the heating unit 130 may heat the excreta of the excreta storage tank 120 each time or may also be stopped in summer with an increased temperature so that natural fermentation takes place. When the atmospheric temperature decreases, for example, in winter time, the heating unit 130 may be operated so that the excreta is not hardened quickly. The excreta heated by the heating unit 130 generates a large amount of methane gas. Thus, the heating unit 130 may reduce a fermentation process time compared to a natural fermentation method so as to increase a productivity of methane gas and collect more methane gas via a relatively small area. In addition, when using the heating unit 130, heating may be conducted also in winter time when the atmospheric temperature decreases, so that methane gas may be collected at any time.

Referring to FIG. 1 again, the methane gas supply unit 140 may suck methane gas erupted from the excreta storage tank 120 and discharge the methane gas to the gas storage tank 150.

The gas storage tank 150 may store the methane gas supplied from the methane gas supply unit 140 and discharge only methane gas from which moisture is eliminated using the moisture eliminator 151. The methane gas from which moisture is eliminated by the moisture eliminator 151 may be used as energy sources used for cooling or heating purposes of various buildings.

According to the septic tank 100 for generating methane gas of the present exemplary embodiment described above, by using high-density excreta, methane gas may be produced and wastewater discharge may be reduced to thereby prevent environmental pollution.

While the inventive concept has been particularly described with reference to exemplary embodiments thereof, the scope of the inventive concept is not limited to the described exemplary embodiments, and it will be understood by those of ordinary skill in the art that various modifications or changes may be made therein without departing from the spirit and scope of the inventive concept as defined by the appended claims, and the exemplary embodiments will be construed as being included in the inventive concept.

For example, the electricity received through the electric device according to the present exemplary embodiment described above may be electricity supplied from the building, but is not limited thereto, and may also be electricity generated from sunlight. That is, solar energy collected from solar light by using solar cell panels for collecting solar light may be converted into electrical energy and used to transfer heat to the heating unit 130.

Figure 4:
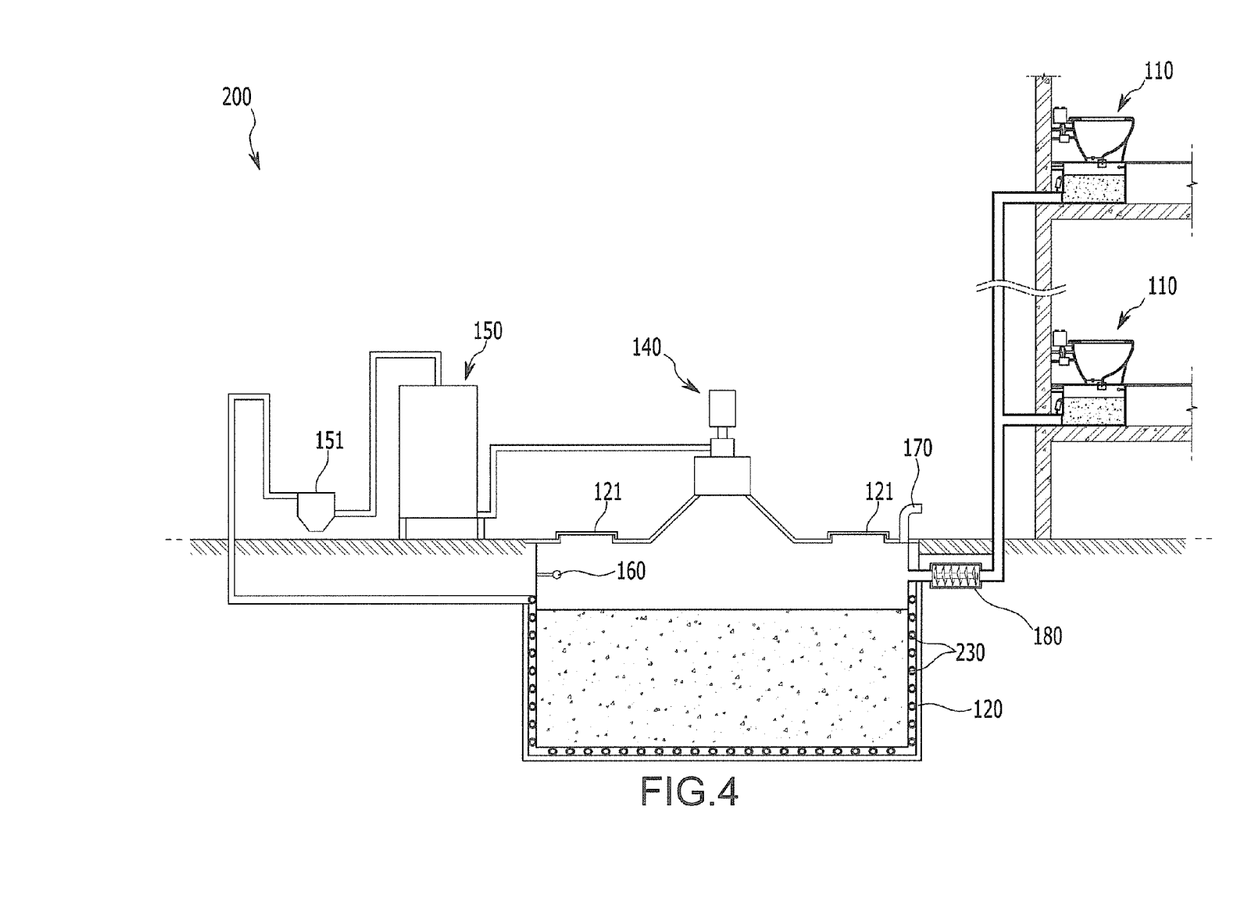
FIG. 4 is a schematic view of a septic tank for generating methane gas, according to another exemplary embodiment of the inventive concept.

FIG. 4 illustrates a septic tank 200 for generating methane gas, according to another exemplary embodiment. Like reference numerals as those of FIGS. 1 through 3 denote like elements having like structures and operations, and thus repeated description thereof will be omitted.

Referring to FIG. 4, a heating unit 230 according to another exemplary embodiment may be a heating pipe.

The heating pipe includes hollows holes so that hot water may circulate therethrough, and is installed in the excreta storage tank 120 in a hot water circulating manner. The heating unit 230 may use external fuel to heat the hot water in the heating pipe, but is not limited thereto. That is, methane gas discharged from the gas storage tank 150 may be used as an energy source as fuel. Thus, as the heating unit 230 is heated by using the methane gas generated from the excreta storage tank 120, methane gas may be produced at low costs.

As a water-saving type toilet used in the septic tank for generating methane gas according to the inventive concept, any type of toilet that uses less water than conventional ones may be used. In detail, a water-saving type toilet that uses 1 to 5 liters of water per each discharge, which is about 5% to about 25% of water of conventional typical toilets, may be used.

Figure 2:
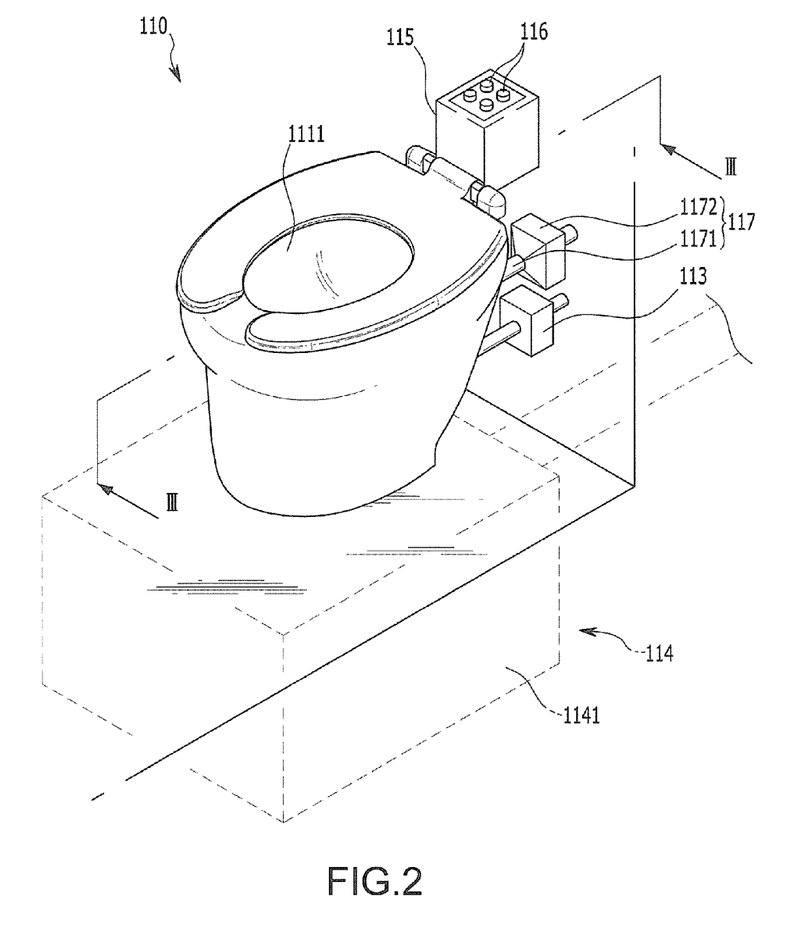
FIG. 2 is a perspective view of a water-saving type toilet illustrated in FIG. 1.
Figure 3:
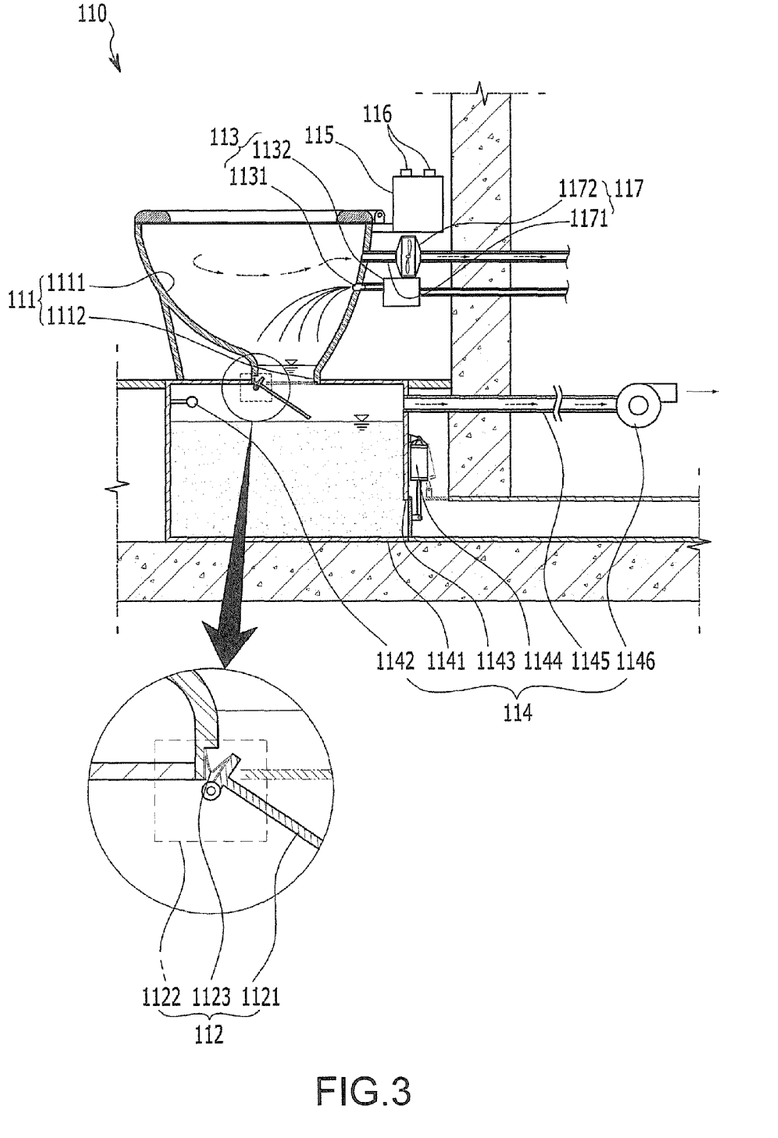
FIG. 3 is a cross-sectional view of the water-saving type toilet illustrated in FIG. 2 cut along a line III-III to describe an operating state of the water-saving type toilet.

Hereinafter, an example of the water-saving type toilet 110 will be described with reference to FIGS. 2 and 3. By using the water-saving type toilet as above, excreta of a relatively high density may be discharged using a less amount of water when discharging excreta.

The water-saving type toilet 110 includes a toilet main body 111, a discharging unit 112, a water supply unit 113, an intermediate storage unit 114, a control unit 115, and a manipulation button 116.

The toilet main body 111 includes a receiving portion 1111 and a discharge outlet 1112. The receiving portion 1111 has a structure via which a user may relieve oneself, and temporarily stores excreta of the user and water. The discharge outlet 1112 is formed at a lower portion of the receiving portion 1111 to discharge excreta and water. The discharging unit 112 is installed at the discharge outlet 1112 so that excreta collected in the receiving portion 1111 is discharged through the discharge outlet 1112. The discharging unit 112 includes a cover 1121 and a driving unit 1122. The cover 1121 is rotatably installed at the discharge outlet 1112 to open or close the discharge outlet 1112. The cover 1121 may be hinge-coupled to the discharge outlet 1112 as illustrated in FIG. 3. The driving unit 1122 is connected to the cover 1121 and provides a rotational force to the cover 1121 so as to open or close the discharge outlet 1112. According to the present exemplary embodiment, a seal cover 1123 may be included so as to tightly seal space between the discharge outlet 1112 and a hinge. The seal cover 1123 prevents leakage of excreta through a gap of the hinge when the discharge outlet 1112 is opened. The seal cover 1123 may be formed of an elastic material having elasticity such as rubber, which is contractible and expandable.

The water supply unit 113 is connected to the toilet main body 111 to supply water into the receiving portion 1111. When the discharge outlet 1112 is opened via the discharging unit 112, the water supply unit 113 supplies water into the receiving portion 1111 so that excreta is discharged through the discharge outlet 1112. The water supply unit 113 includes an inlet 1131 and a feed water valve 1132. The inlet 1131 is installed at the toilet main body 111 so that water is supplied therethrough into the receiving portion 1111. In particular, through the inlet 1131, water may be supplied towards the discharge outlet 1112 in the receiving portion 1111 in order to easily discharge excreta discharged from the discharge outlet 1112, with water. The feed water valve 1132 is connected to the inlet 1131. The feed water valve 1132 connects a feed water pipe provided from the outside, such as a water main, to supply water into the inlet 1131. The feed water valve 1132 may be used to adjust an amount of water supplied to the inlet 1131.

The intermediate storage unit 114 is buried below the toilet main body 111 to store water and excreta discharged through the discharge outlet 1112 by using the discharging unit 112. The intermediate storage unit 114 is buried on the bottom surface of a building so as to immediately store water and excreta discharged from the toilet main body 111. The intermediate storage unit 114 includes an intermediate storage tank 1141, a level sensor 1142, an intermediate discharge outlet 1143, and a discharge valve 1144.

The intermediate storage tank 1141 is buried below the toilet main body 111, that is, on the bottom surface of a building. The intermediate storage tank 1141 has internal space to store excreta discharged through the discharge outlet 1112. In particular, each connection portion of the intermediate storage tank 1141 may be tightly sealed so that excreta in the intermediate storage tank 1141 is not discharged to the outside. The level sensor 1142 is installed in an upper portion in the intermediate storage tank 1141. The level sensor 1142 senses a level of excreta stored in the intermediate storage tank 1141 as to whether the excreta is filled to the brim. The intermediate discharge outlet 1143 is formed at a lower portion of the intermediate storage tank 1141. The intermediate discharge outlet 1143 is formed such that excreta in the intermediate storage tank 1141 is discharged through the intermediate discharge outlet 1143 to the excreta storage tank 120. A pipe connecting the excreta storage tank 120 to the intermediate discharge outlet 1143 is installed at the intermediate discharge outlet 1143, and excreta of the intermediate storage tank 1141 is discharged to the excreta storage tank 120 through the pipe. The discharge valve 1144 is mounted at the intermediate discharge outlet 1143 to open or close the intermediate discharge outlet 1143. The discharge valve 1144 is controlled by the control unit 115, which will be described later, to open the intermediate discharge outlet 1143 when it is detected by the level sensor 1142 that the intermediate storage tank 1141 is filled to the brim. In regard to an operation of the intermediate storage unit 114 described above, excreta and water discharged through the discharge outlet 1112 by the discharging unit 112 are stored in the intermediate storage tank 1141. When the excreta is filled to the brim in the intermediate storage tank 1141 and the level sensor 1142 detects this fully filled state, the level sensor 1142 transmits a sensing signal indicating the fully filled state to the control unit 115. The control unit 115 controls the discharge valve 1144 to open the intermediate discharge outlet 1143. When the discharge valve 1144 is opened, the excreta and water stored in the intermediate storage tank 1141 are discharged to the excreta storage tank 120 through the intermediate discharge outlet 1143. When discharging of the excreta and water in the intermediate storage tank 1141 is completed, the control unit 115 closes the intermediate discharge outlet 1143.

In the above-described structure, various controlling methods are provided to close the discharge outlet 1112 via the discharge valve 1144. That is, the control unit 115 may control the discharge valve 1144 such that the discharge valve 1144 opens the intermediate discharge outlet 1143 for a predetermined period of time and then automatically closes the intermediate discharge outlet 1143. According to circumstances, a lower sensor (not shown) may be installed in a lower portion of the intermediate storage tank 1141, and when discharging of excreta and water of the intermediate storage tank 1141 is completed, the completion of discharging may be detected and the discharge valve 1144 may be controlled by the control unit 115 to close the intermediate discharge outlet 1143.

The intermediate storage unit 114 according to the present exemplary embodiment may further include an exhaust pipe 1145 and an exhaust pump 1146. The exhaust pipe 1145 is installed at the intermediate storage tank 1141 to discharge stench in the intermediate storage tank 1141 to the outside. The exhaust pump 1146 is installed in the exhaust pipe 1145 so as to discharge stench in the intermediate storage tank 1141 to the outside through the exhaust pipe 1145. That is, the exhaust pump 1146 may suck the air of the exhaust pipe 1145 to discharge the air in the intermediate storage tank 1141 to the outside.

The control unit 115 controls operations of the discharging unit 112, the water supply unit 113, and the intermediate storage unit 114. The control unit 115 controls the driving unit 1122 of the discharging unit 112 so that the cover 1121 may open or close the discharge outlet 1112. That is, the cover 1121 may be opened so that excreta in the receiving portion 1111 is discharged to the intermediate storage tank 1141 through the discharge outlet 1112.

In addition, the control unit 115 may control the feed water valve 1132 such that water is supplied into the receiving portion 1111 through the inlet 1131. The control unit 115 may adjust an amount of water supplied through the feed water valve 1132. Also, when excreta is filled to the brim in the intermediate storage tank 1141, the control unit 115 may receive a signal from the level sensor 1142 that has detected that the excreta is filled to the brim, and control the discharge valve 1144 to open the discharge outlet 1112. As described above, the control unit 115 controls operations of the discharging unit 112, the water supply unit 113, and the intermediate storage unit 114. In particular, the control unit 115 may control the operations of the discharging unit 112, the water supply unit 113, and the intermediate storage unit 114 at a time or may independently control each of the operations of the discharging unit 112, the water supply unit 113, and the intermediate storage unit 114.

The manipulation button 116 transmits a discharge command of a user to the control unit 115 so as to discharge excreta and water that are temporarily stored in the receiving portion 1111 to the intermediate storage tank 1141. In detail, when the user manipulates the manipulation button 116, the control unit 115 operates the driving unit 122 such that the cover 1121 of the discharging unit 112 opens the discharge outlet 1112. Here, the feed water valve 1132 of the water supply unit 113 is opened such that water is supplied into the receiving portion 1111. Accordingly, water and excreta in the receiving portion 1111 are discharged to the intermediate storage tank 1141 through the discharge outlet 1112. The manipulation button 116 may give a command such that the discharging unit 112 and the water supply unit 113 operate at a time or operate independently of each other.

According to the present exemplary embodiment, a stench removing unit 117 that is connected to the receiving portion 1111 of the toilet main body 111 to remove stench generated from excreta in the receiving portion 1111 is further included. The stench removing unit 117 includes a suction pipe 1171 and a ventilation fan 1172. The suction pipe 1171 is fluidly connected to the receiving portion 1111 of the toilet main body 111. The ventilation fan 1172 is mounted in the suction pipe 1171 so as to suck the air in the receiving portion 1111 through the suction pipe 1171 and discharge the air to the outside. The stench removing unit 117 may effectively discharge stench generated from the receiving portion 1111 as the user manipulates the manipulation button 116 while or after relieving oneself.

Hereinafter, an operational state of the toilet main body 110 illustrated in FIG. 3 will be described.

After the user has relieved oneself, the user presses the manipulation button 116 to discharge excreta that is temporarily stored in the receiving portion 1111. The control unit 115 receives a discharge command signal of the manipulation button 116 so that the cover 1121 of the discharging unit 112 opens the discharge outlet 1112. The driving unit 1122 rotates the cover 1121 so as to open the discharge outlet 1112. Also, the control unit 115 opens the feed water valve 1132 so that water is supplied into the receiving portion 1111 through the inlet 1131 of the water supply unit 113. Here, to remove stench due to the excreta in the receiving portion 1111, the ventilation fan 1172 of the stench removing unit 117 may be operated. The ventilation fan 1172 sucks stench of the receiving portion 1111 through the suction pipe 1171 and discharges the stench to the outside.

In the above operation, a relatively small amount of about 1 to 5 liters of water is used to discharge the excreta in the receiving portion 1111 to thereby reduce a usage amount of water. That is, high-density excreta may be discharged using water of an amount of about 1/10 of or less than an amount of water used according to the conventional method.

Next, an operation of discharging excreta filled to the brim of the intermediate storage tank 1141 to the outside will be described.

When excreta is filled to the brim of the intermediate storage tank 1141, the level sensor 1142 senses this fully filled state and transmits a signal to the control unit 115. The control unit 115 operates the discharge valve 1144 to open the discharge outlet 1112. The excreta in the intermediate storage tank 1141 is discharged through the discharge outlet 1112. When the discharge valve 1144 is opened while the excreta is filled to the brim in the intermediate storage tank 1141, the excreta stored in the intermediate storage tank 1141 is discharged to the excreta storage tank 120 as a water pressure of the excreta stored in the intermediate storage tank 1141 is generated by the self-weight of the excreta.

According to the septic tank for generating methane gas of the inventive concept, high-density excreta may be stored and heated so as to increase a fermentation efficiency of methane gas and collect a large amount of methane gas in a short time.

According to the septic tank for generating methane gas of the inventive concept, methane gas may be produced using high-density excreta, and discharge of wastewater may be reduced to thereby prevent environmental pollution.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:
1. A septic tank for generating methane gas, comprising:
   a water-saving type toilet installed in a restroom of a building and discharging excreta of users, wherein high-density excreta is discharged from the water-saving type toilet by using a reduced amount of water to discharge the excreta;

an excreta storage tank buried underground and connected to the water-saving type toilet to store the excreta discharged from the water-saving type toilet;

a heating unit for heating the excreta storage tank so as to increase a fermentation speed of the excreta in the excreta storage tank;

a methane gas supply unit for collecting and discharging methane gas generated as the excreta in the excreta storage tank is fermented; and a gas storage tank connected to the methane gas supply unit to store the methane gas discharged from the methane gas supply unit, wherein the water-saving type toilet comprises:

a toilet main body configured such that a user may sit thereon to relieve oneself, the toilet main body comprising a receiving portion temporarily storing excreta of the user and a discharge outlet through which the excreta is discharged;

a discharging unit installed at the discharge outlet to discharge excreta collected in the receiving portion through the discharge outlet and opening or closing the discharge outlet;

a water supply unit for supplying water to the receiving portion so that the excreta is discharged through the discharge outlet when the discharge outlet is opened by using the discharging unit;

an intermediate storage unit comprising an intermediate storage tank buried below the toilet main body so as to receive and store the excreta and water discharged through the discharge outlet of the toilet main body, a level sensor installed in an upper portion of the intermediate storage tank to sense a water level in the intermediate storage tank, an intermediate discharge outlet disposed at a lower portion of the intermediate storage tank to be connected to a pipe that is fluidly connected to a septic tank of a building, and a discharge valve for opening the intermediate discharge outlet when it is sensed by the level sensor that the intermediate storage tank is filled to the brim so as to discharge the excreta and water stored in the intermediate storage tank;

a control unit for controlling operations of the discharging unit, the water supply unit, and the intermediate storage unit; and    a manipulation button via which a discharge command of the user is transmitted to the control unit, the discharge command of the user being given to operate the discharging unit and the water supply unit so as to discharge the excreta and water temporarily stored in the receiving portion to the intermediate storage tank of the intermediate storage unit.

2. The septic tank of claim 1, wherein the water-saving type toilet discharges excreta by using about 1 liter to about 5 liters of water per each discharge.

3. The septic tank of claim 1, wherein the intermediate storage unit comprises:

an exhaust pipe installed in the intermediate storage tank to exhaust stench in the intermediate storage tank; and    an exhaust pump installed in the exhaust pipe to discharge the stench in the intermediate storage tank to the outside through the exhaust pipe.

4. The septic tank of claim 1, wherein the heating unit comprises hot wires that are installed in the excreta storage tank and generate heat by receiving electricity.

5. The septic tank of claim 1, wherein the heating unit comprises a heating pipe installed in the excreta storage tank to receive heated water so as to heat the excreta storage tank.

6. The septic tank of claim 5, wherein the heating unit receives the methane gas stored in the gas storage tank to burn the methane gas so as to supply hot water to the heating pipe.

7. The septic tank of claim 1, further comprising:

a pressure sensor for sensing an internal pressure of the excreta storage tank; and    a gas discharge valve that is opened when the internal pressure of the excreta storage tank sensed by using the pressure sensor is equal to or higher than a predetermined pressure.

8. The septic tank of claim 1, wherein the methane gas supply unit is a supply pump that sucks methane gas in the excreta storage tank and transports the methane gas to the gas storage tank.

9. The septic tank of claim 1, further comprising a crusher installed at the excreta storage tank to crush the excreta flowing into the excreta storage tank.

* * * * *